(12) United States Patent
Kayatani et al.

(10) Patent No.: US 8,014,123 B2
(45) Date of Patent: Sep. 6, 2011

(54) MULTILAYER CERAMIC ELECTRONIC COMPONENT AND METHOD FOR MAKING THE SAME

(75) Inventors: Takayuki Kayatani, Echizen (JP); Akihiro Motoki, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 273 days.

(21) Appl. No.: 12/469,799

(22) Filed: May 21, 2009

(65) Prior Publication Data

US 2009/0310277 A1 Dec. 17, 2009

(30) Foreign Application Priority Data

Jun. 13, 2008 (JP) ................................. 2008-155289

(51) Int. Cl.
 *H01G 4/228* (2006.01)
(52) U.S. Cl. ............... 361/306.3; 361/321.1; 361/321.2; 361/306.1; 361/308.1; 361/313
(58) Field of Classification Search ............... 361/306.1, 361/306.3, 303–305, 308.1, 309–312, 321.1, 361/321.2, 301.2, 301.4
See application file for complete search history.

(56) References Cited

U.S. PATENT DOCUMENTS

| | | | | |
|---|---|---|---|---|
| 6,310,757 B1 * | 10/2001 | Tuzuki et al. | ............. | 361/308.1 |
| 6,344,963 B1 * | 2/2002 | Mori | ............. | 361/306.3 |
| 6,522,521 B2 * | 2/2003 | Mizuno et al. | ............. | 361/321.4 |
| 6,960,366 B2 | 11/2005 | Ritter et al. | | |
| 6,972,942 B2 | 12/2005 | Ritter et al. | | |
| 6,982,863 B2 | 1/2006 | Galvagni et al. | | |
| 7,054,136 B2 * | 5/2006 | Ritter et al. | ............. | 361/309 |
| 7,067,172 B2 | 6/2006 | Ritter et al. | | |
| 7,152,291 B2 | 12/2006 | Ritter et al. | | |
| 7,154,374 B2 | 12/2006 | Ritter et al. | | |
| 7,161,794 B2 | 1/2007 | Galvagni et al. | | |
| 7,177,137 B2 | 2/2007 | Ritter et al. | | |
| 7,295,421 B2 * | 11/2007 | Mihara et al. | ............. | 361/308.1 |
| 7,304,831 B2 * | 12/2007 | Yoshii et al. | ............. | 361/321.2 |

(Continued)

FOREIGN PATENT DOCUMENTS

WO 2007/049456 A1 5/2007

(Continued)

OTHER PUBLICATIONS

Takeuchi et al.; "Laminated Electronic Component and Method for Manufacturing the Same"; U.S. Appl. No. 12/466,393, filed May 15, 2009.

(Continued)

*Primary Examiner* — Nguyen T Ha
(74) *Attorney, Agent, or Firm* — Keating & Bennett, LLP (57) ABSTRACT

A multilayer ceramic electronic component includes a ceramic body including a plurality of ceramic layers, the ceramic body having a first main surface and a second main surface and a plurality of side surfaces that connect the first main surface to the second main surface, an internal conductor including nickel, the internal conductor being disposed in the ceramic body and having an exposed portion exposed at least one of the side surfaces, and an external terminal electrode disposed on at least one of the side surfaces of the ceramic body, the external terminal electrode being electrically connected to the internal conductor. The external terminal electrode includes a first conductive layer including a Sn—Cu—Ni intermetallic compound, the first conductive layer covering the exposed portion of the internal conductor at least one of the side surfaces of the ceramic body.

8 Claims, 11 Drawing Sheets

U.S. PATENT DOCUMENTS

| | | |
|---|---|---|
| 7,344,981 B2 | 3/2008 | Ritter et al. |
| 7,345,868 B2 | 3/2008 | Trinh |
| 7,463,474 B2 | 12/2008 | Ritter et al. |
| 7,719,852 B2 * | 5/2010 | Horie et al. .................. 361/763 |
| 2005/0046536 A1 | 3/2005 | Ritter et al. |
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0145551 A1 | 6/2008 | Kunishi et al. |
| 2008/0151470 A1 | 6/2008 | Motoki et al. |
| 2008/0158774 A1 | 7/2008 | Trinh |
| 2008/0210564 A1 | 9/2008 | Motoki et al. |
| 2008/0225462 A1 | 9/2008 | Motoki et al. |
| 2008/0239617 A1 | 10/2008 | Motoki et al. |
| 2009/0052114 A1 | 2/2009 | Motoki et al. |

FOREIGN PATENT DOCUMENTS

| | | |
|---|---|---|
| WO | 2008/023496 A1 | 2/2008 |

OTHER PUBLICATIONS

Kawasaki et al.; "Laminated Electronic Component and Method for Manufacturing the Same"; U.S. Appl. No. 12/466,435, filed May 15, 2009.

* cited by examiner

MULTILAYER CERAMIC ELECTRONIC COMPONENT AND METHOD FOR MAKING THE SAME

BACKGROUND OF THE INVENTION

1. Field of the Invention

The present invention relates to multilayer ceramic electronic components and methods for making the multilayer ceramic electronic components. In particular, the present invention relates to an external terminal electrode for a multilayer ceramic electronic component and a method for making the external terminal electrode.

2. Description of the Related Art

The market for small portable electronic appliances such as cellular phones, laptop computers, digital cameras, and digital audio equipment has grown in recent years. These portable electronic appliances not only continue to be miniaturized but also continue to provide higher performance. While portable electronic appliances include numerous multilayer ceramic electronic components, size reduction and higher performance are also demanded for the multilayer ceramic electronic components. For example, multilayer ceramic capacitors are required to be further reduced in size and to have a higher capacitance.

In order to reduce the size of multilayer ceramic capacitors and increase their capacitance, it is effective to reduce the thickness of ceramic layers. Recently, capacitors having ceramic layer thicknesses of 3 μm or less have been used in practical applications. Although further thickness reduction is currently being pursued, a problem arises in that short-circuiting between internal electrodes is more likely to occur when the thickness of the ceramic layers is reduced, thereby making it difficult to ensure the quality of the capacitors.

Another effective way is to increase the effective area of internal electrodes. However, for mass production of multilayer ceramic capacitors, side margins between the internal electrodes and the side surfaces of the ceramic element bodies and end margins between the internal electrodes and the end surfaces of the ceramic element bodies must be maintained in order to compensate for misalignment of stacked ceramic green sheets and deviations in cutting. Thus, the degree to which the effective area of the internal electrodes can be increased is limited.

To increase the effective area of internal electrodes while maintaining the required margins, the area of the ceramic layers must be increased. However, the degree to which the area of the ceramic layers can be increased is limited due to the designated size standards. Furthermore, the thickness of the external terminal electrodes is also a limiting factor.

Typically, external terminal electrodes of multilayer ceramic capacitors are formed by baking conductive paste applied on end portions of ceramic bodies. The mainstream method for applying the conductive paste is to dip end portions of ceramic bodies into conductive paste contained in a paste vessel. According to this method, the thickness of the conductive paste applied at the center portion of each end surface of the ceramic bodies tends to be greater than that of other portions due to the viscosity of the conductive paste. Thus, because the external terminal electrodes have thick portions (e.g., portions with a thickness exceeding 30 μm), the areas of the ceramic layers must be decreased.

To overcome such a problem, a method for forming external terminal electrodes directly by plating has been proposed (see, for example, International Publication No. 2007/049456). According to this method, plating films are grown from exposed portions (nuclei) of internal electrodes exposed at end surfaces of ceramic bodies, and the exposed portions of adjacent internal electrodes become connected to each other as the plating films grow. Thin, flat external terminal electrodes can be formed by this method as compared to the existing method that uses conductive paste.

However, during plating, the plating solution is likely to enter the internal conductors inside the ceramic bodies. The plating solution includes water-soluble conductive components including a metal complexing agent. Thus, when a ceramic electronic component in such a state is used in a high-temperature high-humidity environment, the presence of moisture and energization cause electrochemical reactions in the internal conductor portions where the plating solution has penetrated, which may result in deterioration and separation of the ceramic layers and decreased reliability of ceramic electronic components.

One way to avoid such a problem caused by the plating solution is to conduct heat treatment at a high temperature of, for example, at least 500° C. after plating to remove the plating solution penetrated inside the ceramic body.

However, when nickel is used as the internal conductor material and copper is used as the underlayer plating film material and when high-temperature heat treatment is performed after the copper plating, the density of the underlayer plating film decreases. This results in the penetration of water and/or the plating solution during subsequent formation of upper layer plating films and has an adverse effect of decreasing the reliability. This is presumably because of interdiffusion between the nickel defining the internal conductors and copper defining the underlayer plating film, which leads to the formation of many voids in the underlayer plating film due to the Kirkendall effect.

SUMMARY OF THE INVENTION

To overcome the problems described above, preferred embodiments of the present invention provide a multilayer ceramic electronic component in which the penetration of the plating solution and moisture is prevented and a method for making the multilayer ceramic electronic component.

A preferred embodiment of the present invention provides a multilayer ceramic electronic component that includes a ceramic body including a plurality of ceramic layers, the ceramic body having a first main surface and a second main surface and a plurality of side surfaces that connect the first main surface to the second main surface, an internal conductor including nickel, the internal conductor being disposed in the ceramic body and having an exposed portion that is exposed at least one of the side surfaces, and an external terminal electrode disposed on at least one of the side surfaces of the ceramic body, the external terminal electrode being electrically connected to the internal conductor. The external terminal electrode includes a first conductive layer including a Sn—Cu—Ni intermetallic compound, the first conductive layer covering the exposed portion of the internal conductor at least one of the side surfaces of the ceramic body.

The external terminal electrode of the multilayer ceramic electronic component may preferably further include a second conductive layer including copper disposed on the first conductive layer. The second conductive layer preferably includes no glass component and is preferably substantially primarily composed of copper.

The external conductive electrode may preferably further include a third conductive layer defined by a plating film, the third conductive layer being the outermost layer of the external terminal electrode.

Another preferred embodiment of the present invention provides a method for making the multilayer ceramic electronic component described above.

The method for making a multilayer ceramic electronic component includes a step of preparing a ceramic body having a first main surface and a second main surface and a plurality of side surfaces connecting the first main surface to the second main surface, the ceramic body including a plurality of ceramic layers stacked on one another and an internal conductor including nickel and having an exposed portion exposed at least one of the side surfaces of the ceramic body, a step of forming a tin-containing layer on at least one of the side surfaces of the ceramic body so that the tin-containing layer covers the exposed portion of the internal conductor, a step of forming a copper-containing layer on the tin-containing layer, and a step of performing heat treatment on the ceramic body having the tin-containing layer and the copper-containing layer formed thereon so that a Sn—Cu—Ni intermetallic compound layer is formed between the internal conductor and the copper-containing layer.

In this method, the step of forming the tin-containing layer preferably includes forming the tin-containing layer by plating, and the step of forming the copper-containing layer preferably includes forming the copper-containing layer by plating.

In this method, the thickness of the copper-containing layer is preferably at least about twice the thickness of the tin-containing layer, for example.

According to various preferred embodiments of the present invention, the first conductive layer including the Sn—Cu—Ni intermetallic compound covering the exposed portion of the internal conductor containing nickel functions as a barrier layer. Thus, for example, interdiffusion of nickel and copper can be prevented even when the second conductive layer including copper is formed on the first conductive layer and heat treatment is performed at a high temperature of at least about 500° C., for example. Thus, the generation of voids by the Kirkendall effect can be prevented, the sealing property at the interfaces between the external terminal electrodes and the ceramic body can be improved, and the reliability of the ceramic electronic component can be improved.

Furthermore, since the first conductive layer and the optional second and third conductive layers that define the external terminal electrode can be formed by plating, these layers can be made thinner and flatter than those formed by using a conductive paste. Thus, size reduction of the multilayer ceramic electronic component can be achieved and the volume of the ceramic body can be increased within a predetermined size standard. Thus, the performance of the multilayer ceramic electronic component can be improved. In particular, when preferred embodiments of the present invention are applied to a multilayer ceramic capacitor, the capacitance can be increased within the predetermined size standard.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
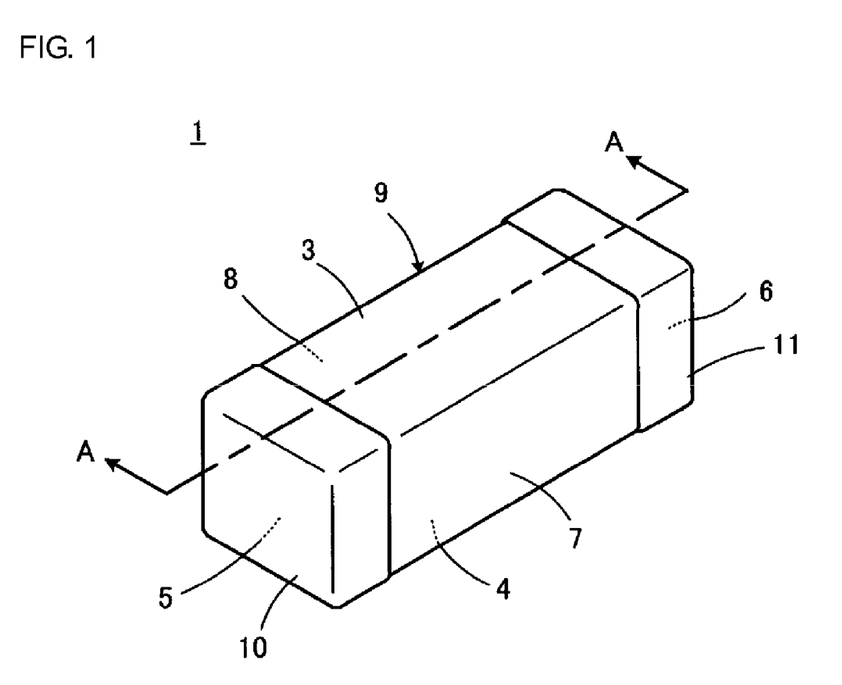
FIG. 1 is a perspective view showing a multilayer ceramic electronic component according to a first preferred embodiment of the present invention.
Figure 2:
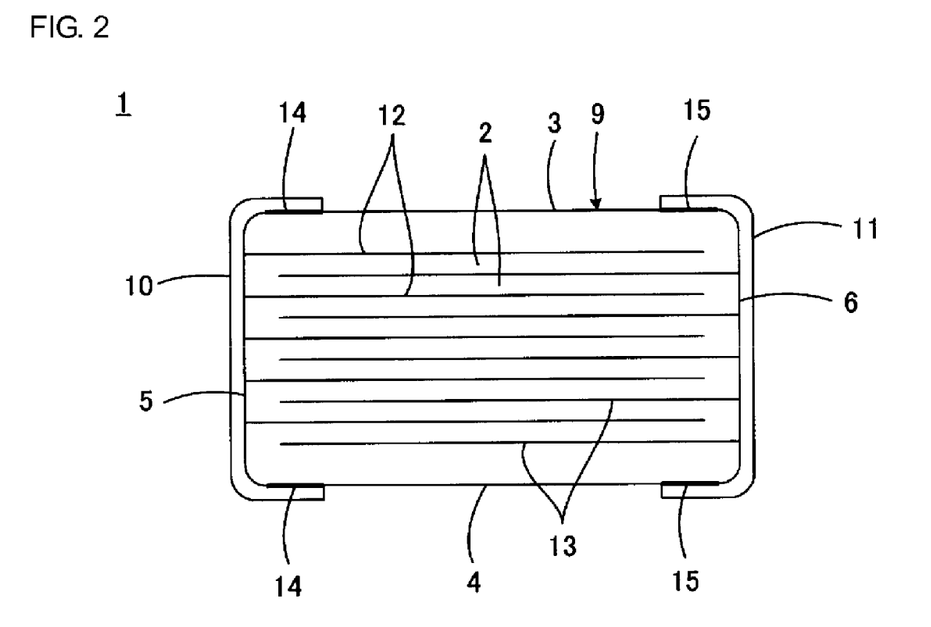
FIG. 2 is a cross-sectional view taken at line A-A in FIG. 1.

FIGS. 1 to 5 illustrate a first preferred embodiment of the present invention. FIG. 1 is a perspective view showing a multilayer ceramic electronic component 1. FIG. 2 is a cross-sectional view taken along line A-A in FIG. 1.

As shown in FIGS. 1 and 2, the multilayer ceramic electronic component 1 includes a ceramic body 9 defined by a plurality of ceramic layers 2 stacked on one another. The ceramic body 9 has a first main surface 3 and a second main surface 4, and first to fourth side surfaces 5 to 8 that connect the first main surface 3 to the second main surface 4. The first side surface 5 faces the second side surface 6, and the third side surface 7 faces the fourth side surface 8.

A first external terminal electrode 10 is disposed on the first side surface 5, and a second external terminal electrode 11 is disposed on the second side surface 6. The first external terminal electrode 10 and the second external terminal electrode 11 are electrically isolated from each other.

As shown in FIG. 2, first internal conductors 12 and second internal conductors 13 are arranged in the ceramic body 9. The first internal conductors 12 extend to the first side surface 5 and are thus electrically connected to the first external terminal electrode 10. The second internal conductors 13 extend to the second side surface 6 and are thus electrically connected to the second external terminal electrode 11.

As shown in FIG. 2, a first auxiliary conductor 14 and a second auxiliary conductor 15 are disposed on the first main surface 3, and another first auxiliary conductor 14 and another second auxiliary conductor 15 are disposed on the second main surface 4. The first auxiliary conductors 14 support portions of the first external terminal electrode 10 that extend onto the first main surface 3 and the second main surface 4, and the second auxiliary conductors 15 support portions of the second external terminal electrode 11 that extend onto the first main surface 3 and the second main surface 4. The first auxiliary conductors 14 and the second auxiliary conductors 15 may extend onto the third side surface 7 and the fourth side surface 8. The first auxiliary conductors 14 and the second auxiliary conductors 15 need not be provided when the extended portions of the first external terminal electrode 10 and the second external terminal electrode 11 are relatively short.

Figure 3A:
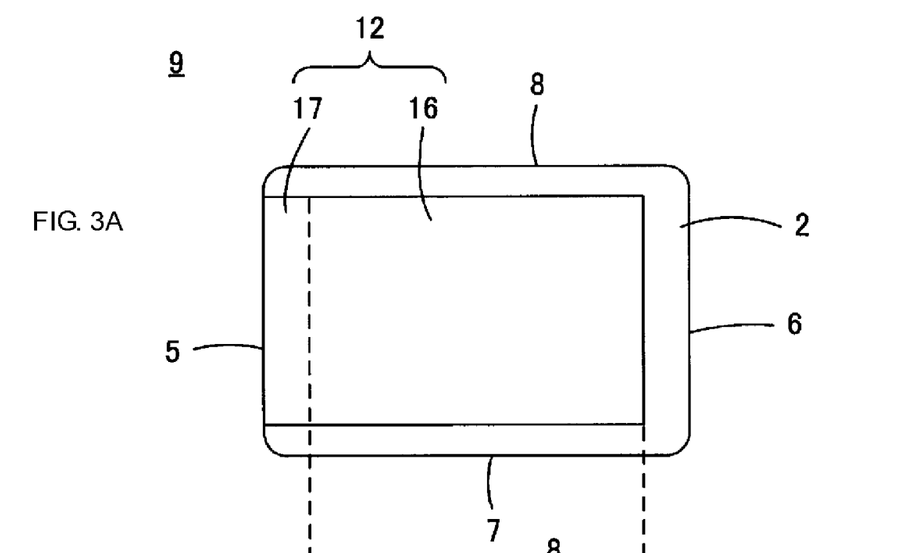
FIGS. 3A and 3B are plan views showing the internal structure of the multilayer ceramic electronic component shown in FIG. 1.
Figure 3B:
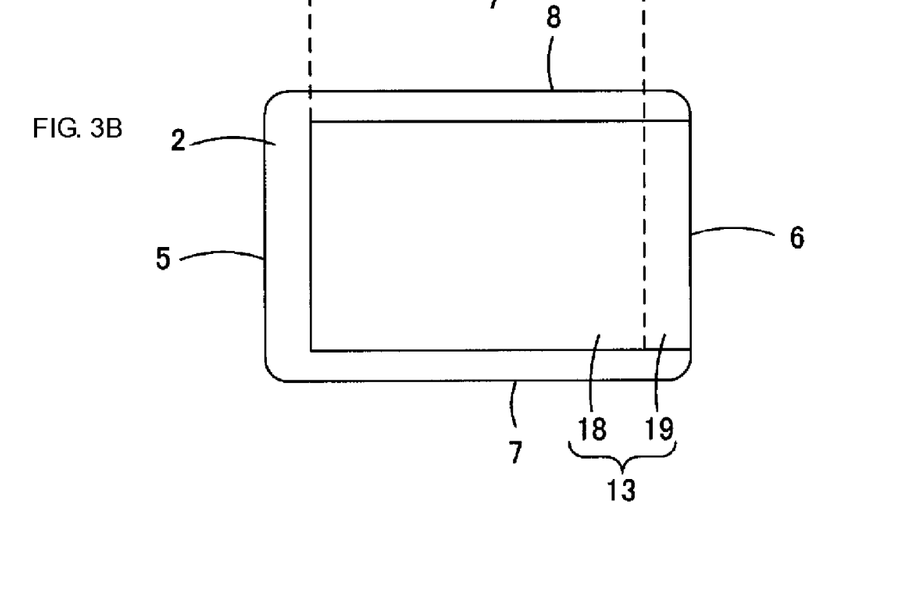

FIGS. 3A and 3B are plan views showing the internal structure of the ceramic body 9 of the multilayer ceramic electronic component 1. FIG. 3A shows the first internal conductor 12 and FIG. 3B shows the second internal conductor 13.

As shown in FIG. 3A, the first internal conductor 12 includes a first effective portion 16 and a first extended portion 17 extended from the first effective portion 16 to the first side surface 5. As shown in FIG. 3B, the second internal conductor 13 includes a second effective portion 18 and a second extended portion 19 extended from the second effective portion 18 to the second side surface 6. A particular electrical characteristic is produced in the portion in which the first effective portion 16 and the second effective portion 18 face each other with a ceramic layer 2 therebetween.

Figure 4:
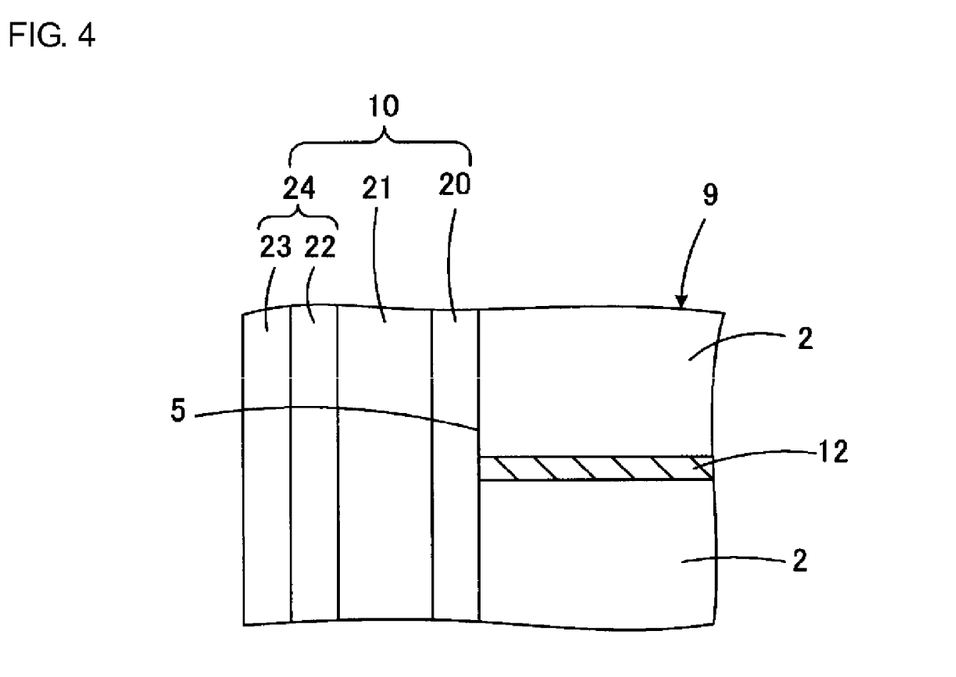
FIG. 4 is an enlarged cross-sectional view of a portion of FIG. 2.

FIG. 4 is a partial enlarged view of FIG. 2 and shows the structure of the first external terminal electrode 10.

As shown in FIG. 4, the first external terminal electrode 10 includes a first conductive layer 20 covering the exposed portion of the first internal conductor 12 on the first side surface 5, and a second conductive layer 21 disposed on the first conductive layer 20. The outermost layer of the first external terminal electrode 10 is defined by a plurality of plating films provided on the second conductive layer 21. For example, the outermost layer of the first external terminal electrode 10 is a third conductive layer 24 defined by a first plating film 22 and a second plating film 23.

Although not shown in the drawing, the multilayer structure including the first conductive layer 20 to the third conductive layer 24 is also provided on the first main surface 3, the second main surface 4, the third side surface 7, and the fourth side surface 8. The second external terminal electrode 11 also has the same or substantially the same structure.

The first conductive layer 20 preferably includes a Sn—Cu—Ni intermetallic compound, for example. The copper and nickel included in the intermetallic compound may be derived from diffusion of copper included in the second conductive layer 21 and nickel included in the internal conductor 12 as described below. The thickness of the first conductive layer 20 is preferably about 1 μm to about 5 μm, for example.

The second conductive layer 21 preferably includes copper, for example. The second conductive layer 21 may also include a glass component. However, since the glass component decreases the density of the second conductive layer 21, the second conductive layer 21 preferably does not include any glass component and is preferably substantially primarily composed of copper. The thickness of the second conductive layer 21 is preferably about 2 μm to about 15 μm, for example. It should be noted that the second conductive layer 21 is not always required. Preferred embodiments with no second conductive layers 21 are also included in the scope of the present invention.

The third conductive layer 24 is provided as required and is not always provided. The thickness of each of the first plating film 22 and the thickness of the second plating film 23 of the third conductive layer 24 is preferably about 1 μm to about 5 μm, for example. The first plating film 22 and the second plating film 23 are preferably each composed of at least one metal selected from the group consisting of Cu, Ni, Sn, Pb, Au, Ag, Pd, Bi, and Zn or an alloy including the at least one metal, for example. when the multilayer ceramic electronic component 1 is to be solder-mounted, nickel having a solder barrier property is preferably used as the metal for the first plating film 22 at the underlayer side, and tin or gold having good solder wettability is preferably used as the metal for the second plating film 23 at the outer surface side. The number of plating films defining the third conductive layer 24 may also be one or three or more, for example.

The ceramic layer 2 may preferably be composed of a dielectric ceramic primarily composed of, for example, $BaTiO_3$, $CaTiO_3$, $SrTiO_3$, or $CaZrO_3$. A mixture of the main component and an auxiliary component such as a Mn compound, an Fe compound, a Cr compound, a Co compound, and a Ni compound, for example, may also be used. Alternatively, a piezoelectric ceramic such as a PZT ceramic and a semiconductor ceramic such as a spinel ceramic, for example, may also be used.

When a dielectric ceramic is used as the material for the ceramic layer 2, the multilayer ceramic electronic component 1 functions as a capacitor. When a piezoelectric ceramic is used, the multilayer ceramic electronic component 1 functions as a piezoelectric component. When a semiconductor ceramic is used, the multilayer ceramic electronic component 1 functions as a thermistor. The thickness of the ceramic layer 2 after firing is preferably about 1 μm to about 10 μm, for example.

The first internal conductor 12 and the second internal conductor 13 include nickel. The first internal conductor 12 and the second internal conductor 13 are preferably substantially primarily composed of nickel. The thickness of each of the internal conductors 12 and 13 after firing is preferably about 0.5 μm to about 2.0 μm, for example.

One example of a method for making the multilayer ceramic electronic component according to a preferred embodiment of the present invention is described below.

First, ceramic green sheets that form the ceramic layers 2 and a conductive paste that forms the internal conductors 12 and 13 including nickel are separately prepared. The ceramic green sheets and the conductive paste include binders and solvents which may preferably be organic binders and organic solvents known in the art may be used as the binders and the solvents, for example.

Next, the conductive paste is printed on the ceramic green sheets by, for example, screen-printing to form predetermined patterns. As a result, ceramic green sheets with conductive paste films that form the first internal conductors 12 and the second internal conductors 13 are obtained.

Next, a predetermined number of the ceramic green sheets with the conductive paste films are stacked in a predetermined order and then a predetermined number of outer layer ceramic green sheets without conductive paste films are stacked on the top and the bottom of the stack of the ceramic green sheets with the conductive paste films to obtain a green mother compact. The green mother compact is press-bonded in the stacking direction by isostatic pressing or other suitable method, if necessary.

The green mother compact is cut to a predetermined size. As a result, the ceramic body 9 in a green state is obtained.

The green ceramic body 9 is then fired. The firing temperature is preferably selected from the range of, for example, about 900° C. to about 1300° C., although the temperature depends on the ceramic materials included in the ceramic green sheets or the metal materials included in the conductive paste films.

Next, polishing such as barrel polishing is performed as required to expose the first internal conductors 12 and the second internal conductors 13. At the same time, the edges and corners of the ceramic body 9 are rounded.

Figure 5:
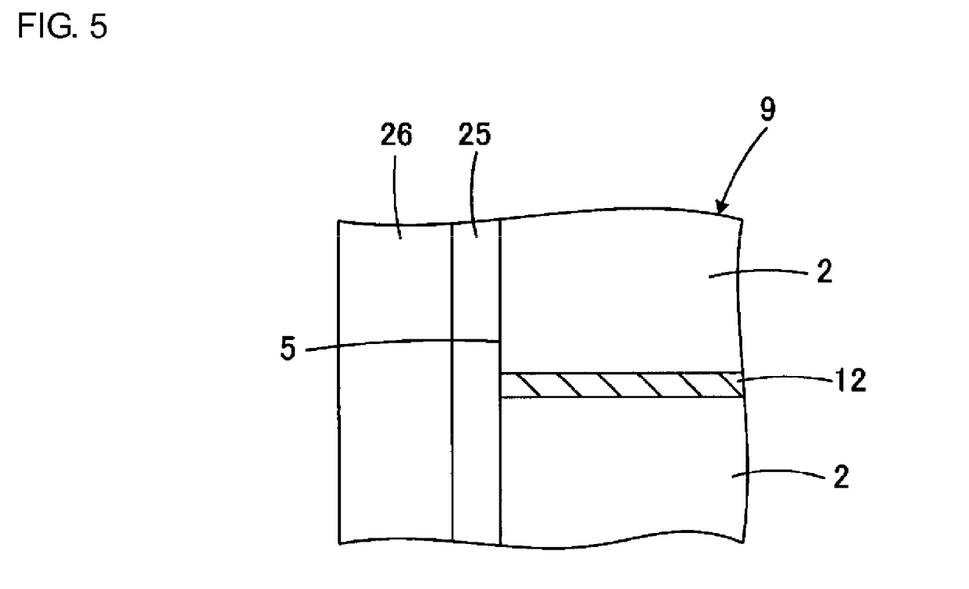
FIG. 5 is an enlarged cross-sectional view showing a state in which a tin-containing layer and a copper-containing layer are formed on a first side surface of a ceramic body in making the multilayer ceramic electronic component shown in FIG. 1.

Tin-containing layers are then respectively formed on the first side surface 5 and the second side surface 6 to cover the exposed portions of the first internal conductors 12 and the second internal conductors 13. FIG. 5 shows a tin-containing layer 25 formed on the first side surface 5 of the ceramic body 9.

The thickness of the tin-containing layer 25 is preferably in the range of about 1 μm to about 5 μm, for example. At a thickness less than about 1 μm, the thickness of the first conductive layer 20 including the intermetallic compound may decrease or the continuity of the first conductive layer 20 may be degraded, possibly resulting in a decrease in the suppressing effect of the interdiffusion of nickel and copper. In contrast, at a thickness exceeding about 5 μm, it may be difficult to form the Sn—Cu—Ni intermetallic compound or voids may be formed in the second conductive layer 21 due to progression of diffusion of copper from a copper-containing layer 26 described below into the tin-containing layer 25.

The tin-containing layer 25 is preferably formed by plating. The tin-based plating is not limited to elementary tin plating and may preferably include a binary plating such as Sn—Cu, Sn—Ni, and Sn—Zn and a ternary plating such as Sn—Cu—Ni, Sn—Cu—Ag, and Sn—Cu—Zn, for example. A composition near the eutectic composition is preferred. For example, for Sn—Cu, about 0.1 to about 1.5 wt % Cu, (eutectic of Cu is at about 0.7 wt %) is preferred, and for Sn—Ni, about 25 to about 30 wt % Ni (eutectic of Sn and Ni is at about 28 wt % Ni) is preferred.

The tin-containing layer 25 may include a glass component but the glass component may decrease the density of the tin-containing layer 25. Thus, preferably the tin-containing layer 25 includes no glass component.

Next, as shown in FIG. 5, a copper-containing layer 26 is formed on the tin-containing layer 25. The thickness of the copper-containing layer 26 is preferably at least about twice the thickness of the tin-containing layer 25. The copper component present in the interface between the tin-containing layer 25 and the copper-containing layer 26 is consumed in the course of generating the intermetallic compound. However, as long as the thickness of the copper-containing layer 26 is at least about twice that of the tin-containing layer 25, a second conductive layer 21 with a sufficient thickness can be secured. The thickness of the copper-containing layer 26 is preferably in the range of about 2 μm to about 15 μm, for example.

The copper-containing layer 26 is preferably formed by plating. The copper-containing layer 26 may include a glass component but the glass component may decrease the density of the copper-containing layer 26. Thus, the copper-containing layer 26 preferably does not include any glass component and is preferably substantially primarily composed of copper.

Next, the ceramic body 9 including the tin-containing layer 25 and the copper-containing layer 26 described above is subjected to heat treatment to form a Sn—Cu—Ni intermetallic compound layer, which forms the first conductive layer 20, between the first internal conductor 12 or the second internal conductor 13 and the copper-containing layer 26. As for the heat treatment conditions, a temperature of about 600° C. to about 1000° C., for example, (preferably about 800° C.) and a low oxygen partial pressure atmosphere (e.g., $N_2$ atmosphere) are preferred. At a temperature of less than about 600° C., the contact between the first internal conductor 12 and the first external terminal electrode 10 and the contact between the second internal conductor 13 and the second external terminal electrode 11 may be degraded. In contrast, since at a temperature of more than about 1000° C., voids are easily generated in the electrode films due to generation of blisters, the density of the electrode films may be decreased.

During the heat treatment, tin included in the tin-containing layer 25, nickel included in the first internal conductor 12 and the second internal conductor 13, and copper contained in the copper-containing layer 26 that become molten during the heat treatment (at about 250° C.) react with one another to form a Sn—Cu—Ni intermetallic compound layer. During this process, although a satisfactory intermetallic compound layer is formed if the tin-containing layer 25 is formed by elementary tin plating, it is preferable to use a binary or ternary tin plating described above to form the tin-containing layer 25 if the reaction with nickel or copper is to be suppressed.

Next, the third conductive layer 24 defined by the first plating film 22 and the second plating film 23 is formed on the copper-containing layer 26, if necessary. The number of plating films defining the third conductive layer 24 is not particularly limited.

It should be noted that when forming the copper-containing layer 26, the tin-containing layer 25, and the third conductive layer 24 by plating, either electrolytic or electroless plating may be used. However, electroless plating has a drawback in that it requires pre-treatment with a catalyst to increase the plating rate, which complicates the process. Therefore, electrolytic plating is preferred. Wet barrel plating is preferably used to perform plating.

Figure 6:
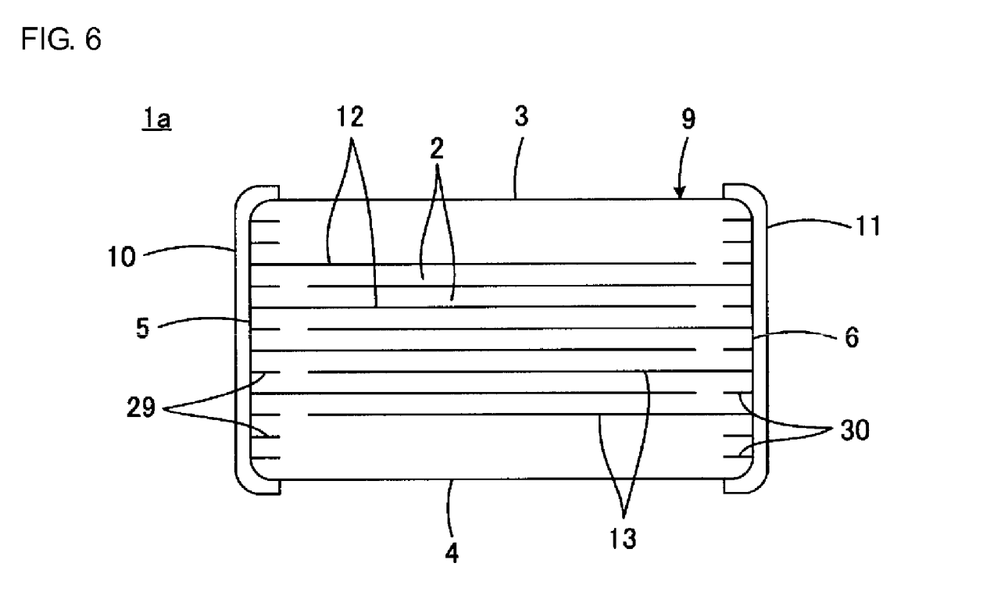
FIG. 6 illustrates a second preferred embodiment of the present invention and is a drawing corresponding to FIG. 2.

FIG. 6 illustrates a second preferred embodiment of the present invention and is a drawing corresponding to FIG. 2. In FIG. 6, the elements similar to those shown in FIG. 2 are represented by the same reference symbols and the duplicate descriptions thereof will not be repeated.

A multilayer ceramic electronic component 1a of the second preferred embodiment of the present invention includes first dummy internal conductors 29 having exposed portions exposed at the first side surface 5 and second dummy internal conductors 30 having exposed portions exposed at the second side surface 6. The first dummy internal conductors 29 and the second dummy internal conductors 30 do not contribute to the production of electrical characteristics.

Some first dummy internal conductors 29 are disposed on the same planes as the second internal conductors 13 while other first dummy internal conductors 29 are disposed on the outer layer portions in which neither the first internal conductors 12 nor the second internal conductors 13 are disposed. Some second dummy internal conductors 30 are disposed on the same planes as the first internal conductors 12 while other second dummy internal conductors 30 are disposed on the outer layer portions in which neither the first internal conductors 12 nor the second internal conductors 13 are disposed.

The exposed portions of the first internal conductors 12 and the exposed portions of the first dummy internal conductors 29 are arranged on the first side surface 5 in an alternating manner along the stacking direction of the ceramic layers 2. This arrangement is the same or substantially the same for the second side surface 6.

Providing the first dummy internal conductors 29 decreases a distance between exposed portions at the first side surface 5 to a distance between the first internal conductor 12 and the first dummy internal conductors 29. Providing the second dummy internal conductors 30 decreases a distance between exposed portions at the second side surface 6 to a distance between the second internal conductor 13 and the second dummy internal conductors 30. Thus, for example, when the tin-containing layers 25 (refer to FIG. 5), i.e., precursors of the first conductive layers 20 (refer to FIG. 4), are formed by plating, the plating can be accelerated.

Although not shown in the drawings, the first external terminal electrode 10 and the second external terminal electrode 11 of the multilayer ceramic electronic component 1a also have the same or substantially the same structure as the first external terminal electrode 10 and are made by the same or substantially the same process as the first external terminal electrode 10 described above with reference to FIG. 4.

Figure 7A:
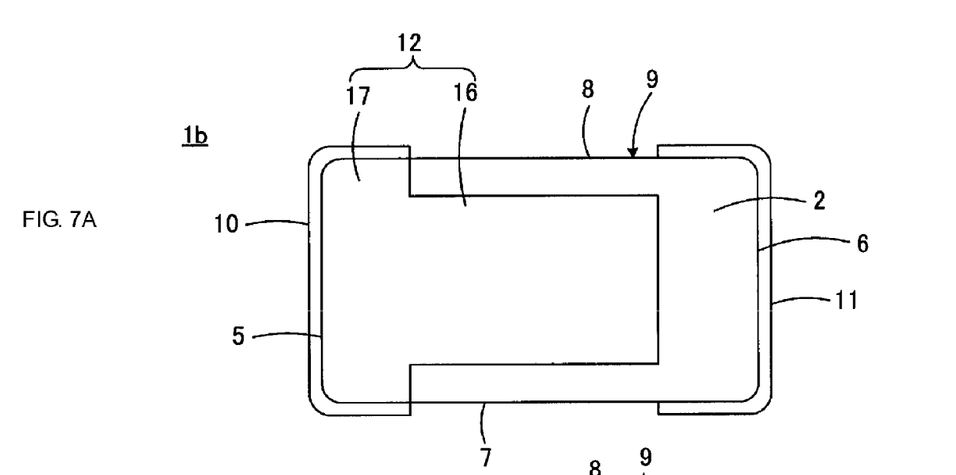
FIGS. 7A and 7B illustrate a third preferred embodiment of the present invention and are drawings corresponding to FIGS. 3A and 3B.
Figure 7B:
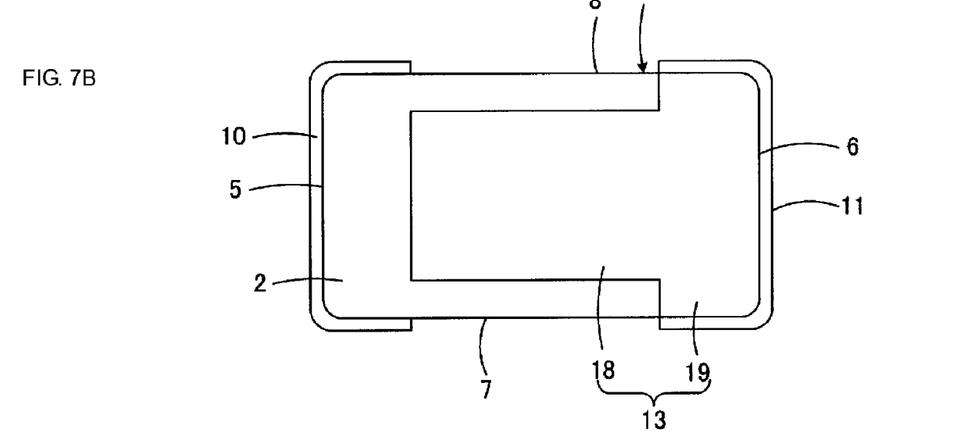

FIGS. 7A and 7B illustrate a third preferred embodiment of the present invention and are drawings corresponding to FIGS. 3A and 3B. Although the ceramic body 9 before forming the first external terminal electrode 10 and the second external terminal electrode 11 is shown in FIGS. 3A and 3B, FIGS. 7A and 7B show a multilayer ceramic electronic component 1b after forming the first external terminal electrode 10 and the second external terminal electrode 11. In FIGS. 7A and 7B, the elements similar to those shown in FIGS. 3A and 3B are represented by the same reference symbols and the duplicate description thereof will not be repeated.

In the multilayer ceramic electronic component 1b of the third preferred embodiment of the present invention, the first internal conductors 12 and the second internal conductors 13 each have a substantial T shape.

An extended portion 17 of the first internal conductor 12 is arranged to be exposed at the first side surface 5, the third side surface 7, and the fourth side surface 8. The extended portion 17 of the first internal conductor 12 is arranged to be continuously exposed from the third side surface 7 to the fourth side surface 8 through the first side surface 5.

An extended portion 19 of the second internal conductor 13 is arranged to be exposed at the second side surface 6, the third side surface 7, and the fourth side surface 8. The extended portion 19 of the second internal conductor 13 is arranged to be continuously exposed from the third side surface 7 to the fourth side surface 8 through the second side surface 6.

The multilayer ceramic electronic component 1b of this preferred embodiment is arranged to be mounted on a mounting substrate (not shown) while arranging the direction in which the first internal conductors 12 and the second internal conductors 13 extend to be perpendicular or substantially perpendicular to the mounting substrate, i.e., while arranging the fourth side surface 8 to be used as the mounting surface.

Although not shown in the drawings, the first external terminal electrode 10 and the second external terminal electrode 11 of the multilayer ceramic electronic component 1b also have the same or substantially the same structure and are made by the same or substantially the same method as the first external terminal electrode 10 described with reference to FIG. 4.

Figure 8:
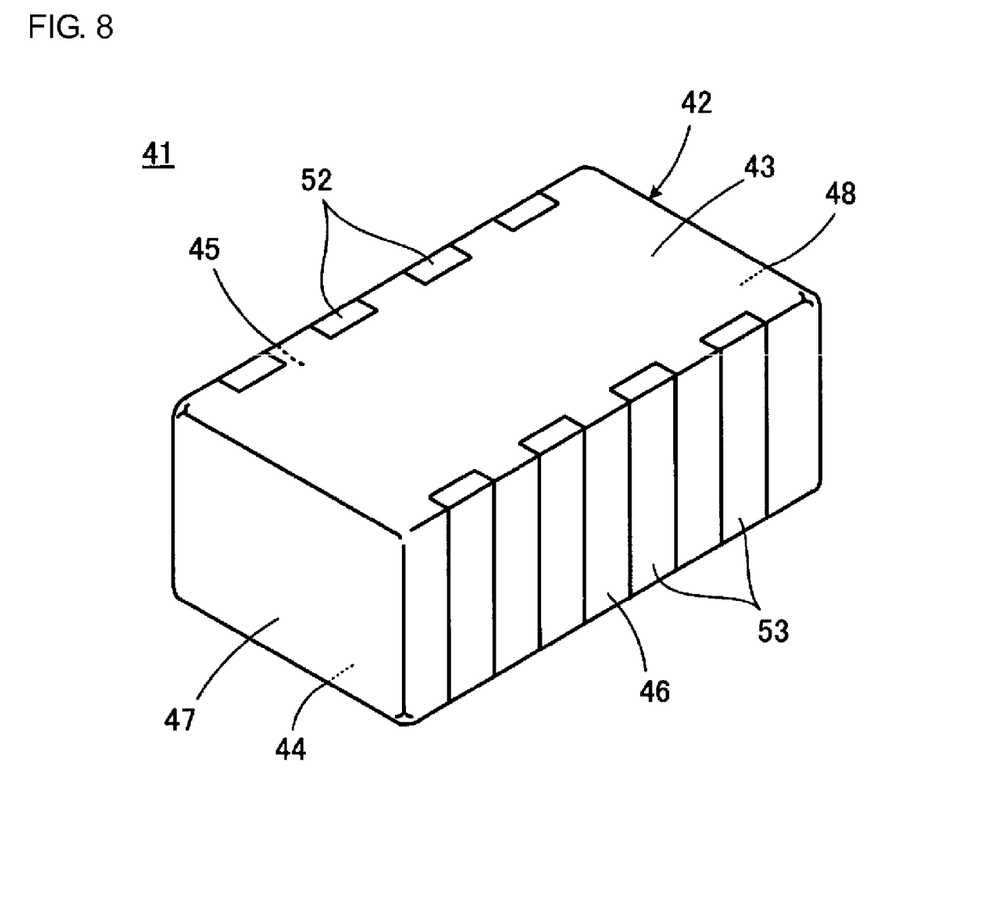
FIG. 8 illustrates a fourth preferred embodiment of the present invention and is a drawing corresponding to FIG. 1.
Figure 9A:
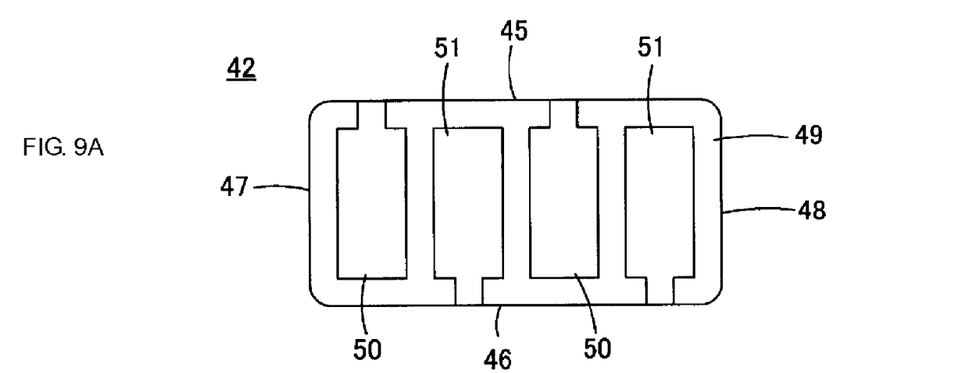
FIGS. 9A and 9B illustrate the fourth preferred embodiment of the present invention and are drawings corresponding to FIGS. 3A and 3B.
Figure 9B:
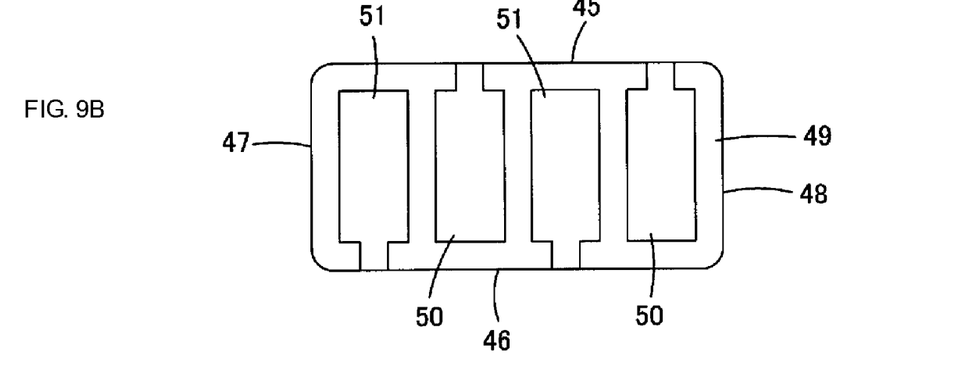

FIGS. 8 to 9B illustrate a fourth preferred embodiment of the present invention. FIG. 8 is a perspective view of a multilayer ceramic capacitor array 41 which is an example of the multilayer ceramic electronic component.

The multilayer ceramic capacitor array 41 includes a ceramic body 42. The ceramic body 42 has a first main surface 43 and a second main surface 44 that face each other, and a first side surface 45, a second side surface 46, a third side surface 47, and a fourth side surface 48 that connect the first main surface 43 to the second main surface 44. The ceramic body 42 has substantially rectangular parallelepiped shape.

FIGS. 9A and 9B are plan views at two different sections showing the internal structure of the ceramic body 42. The ceramic body 42 includes a plurality of ceramic layers 49 stacked on one another. In the ceramic body 42, a plurality of sets of first and second internal conductors 50 and 51 are alternately arranged in the stacking direction as well as in the main surface direction while ceramic layers 49 are interposed between the first and second internal conductors 50 and 51. In this preferred embodiment, two first internal conductors 50 and two second internal conductors 51 are alternately arranged in the main surface direction. Each first internal conductor 50 has an exposed portion exposed at the first side surface 45, and the exposed portions of the first internal conductors 50 are arranged in a plurality of rows. Each second internal conductor 51 has an exposed portion exposed at the second side surface 46, and the exposed portions of the second internal conductors 51 are arranged in a plurality of rows.

As shown in FIG. 8, four first external terminal electrodes 52 electrically isolated from one another are disposed on the first side surface 45 of the ceramic body 42 and four second external terminal electrodes 53 electrically isolated from one another are disposed on the second side surface 46 of the ceramic body 42. The aligned exposed portions of the first internal conductors 50 are covered with and electrically connected to the first external terminal electrodes 52. The aligned exposed portions of the second internal conductors 51 are covered with and electrically connected to the second external terminal electrodes 53.

Although not shown in the drawings, the first external terminal electrodes 52 and the second external terminal electrodes 53 of the multilayer ceramic capacitor array 41 also have the same or substantially the same structure as the first external terminal electrode 10 and are made by the same or substantially the same method as the first external terminal electrode 10 described above with reference to FIG. 4.

Figure 10A:
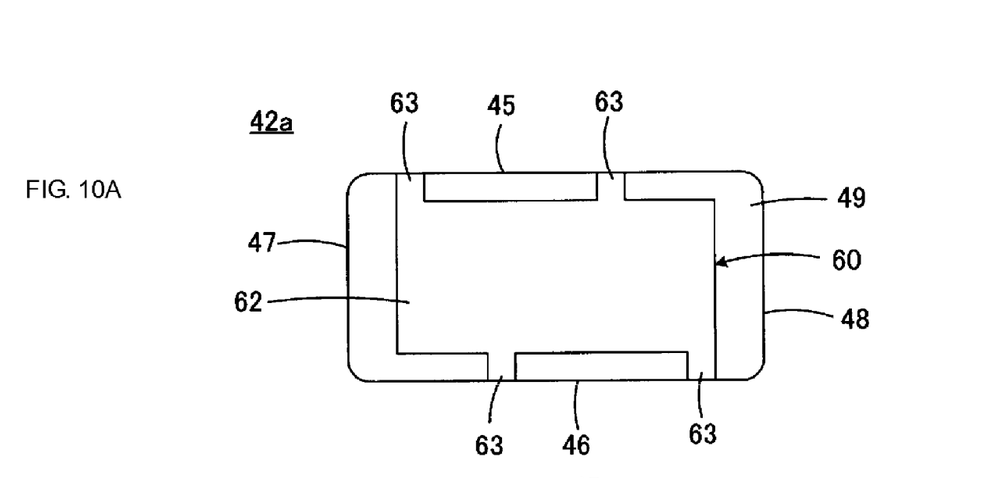
FIGS. 10A and 10B illustrate a fifth preferred embodiment of the present invention and are drawings corresponding to FIGS. 3A and 3B.
Figure 10B:
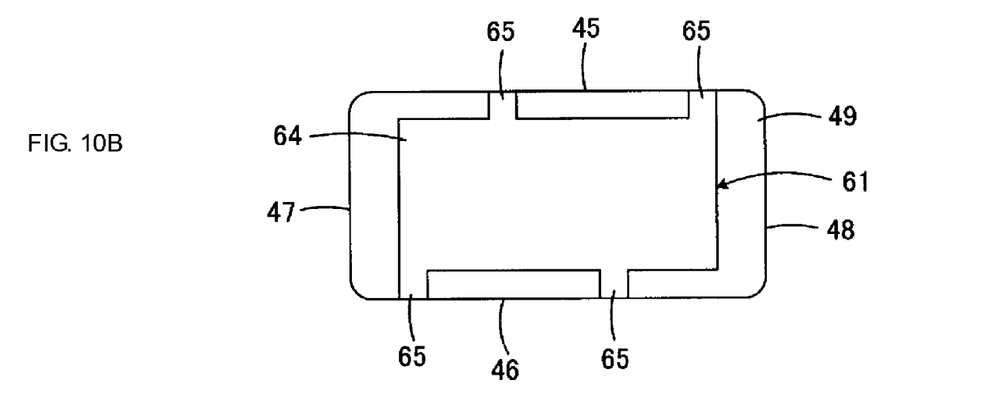

FIGS. 10A and 10B illustrate a fifth preferred embodiment of the present invention. FIGS. 10A and 10B show a ceramic body 42a of a multi-terminal low-ESL multilayer ceramic capacitor, which is an example of the multilayer ceramic electronic component, and correspond to FIGS. 9A and 9B. In FIGS. 10A and 10B, the elements similar to those shown in FIGS. 9A and 9B are represented by the same reference symbols and the duplicate description thereof will not be repeated.

The low-ESL multilayer ceramic capacitor of the fifth preferred embodiment has an appearance that is similar to the capacitor array 41 shown in FIG. 8.

In the ceramic body 42a, a plurality of sets of first and second internal conductors 60 and 61 are alternately arranged in the stacking direction while ceramic layers 49 are interposed between the first and second internal conductors 60 and 61.

Each first internal conductor 60 has a first effective portion 62 that faces the second internal conductor 61, and a plurality of first extended portions 63 extended from the first effective portion 62 to the first side surface 45 and the second side surface 46. An exposed portion exposed at the first side surface 45 or the second side surface 46 is disposed at an end of each first extended portion 63.

Each second internal conductor 61 has a second effective portion 64 that faces the first internal conductor 60, and a plurality of second extended portions 65 extended from the second effective portion 64 to the first side surface 45 and the second side surface 46. An exposed portion exposed at the first side surface 45 or the second side surface 46 is disposed at an end of each second extended portion 65.

The exposed portions of the second extended portions 65 and the exposed portions of the first extended portions 64 are alternately arranged at each of the first side surface 45 and the second side surface 46. In this preferred embodiment, the first and second external terminal electrodes are alternately arranged in each of the first side surface 45 and the second side surface 46 of the ceramic body 42a. The exposed portions of the first internal conductors 60 are covered with and electrically connected to the first external terminal electrodes. The exposed portions of the second internal conductors 61 are covered with and electrically connected to the second external terminal electrodes.

Although not shown in the drawings, the first and second external terminal electrodes of the low-ESL multilayer ceramic capacitor also have the same or substantially the same structure as the first external terminal electrode 10 and are made by the same or substantially the same method as the first external terminal electrode 10 described above with reference to FIG. 4.

Figure 11A:
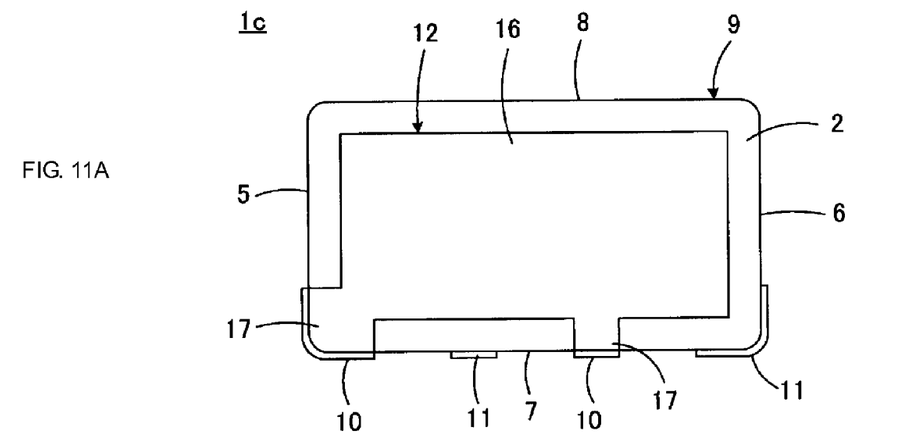
FIGS. 11A and 11B illustrate a sixth preferred embodiment of the present invention and are drawings corresponding to FIGS. 3A and 3B.
Figure 11B:
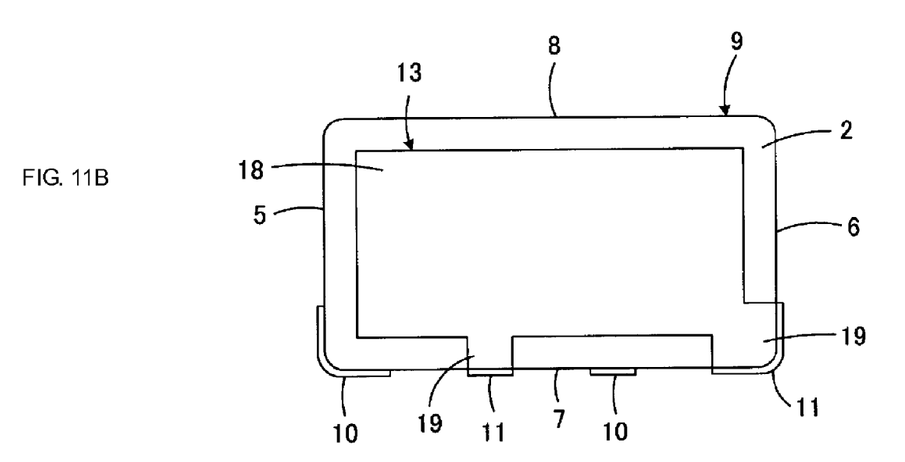

FIGS. 11A and 11B show a multilayer ceramic electronic component 1c according to a sixth preferred embodiment of the present invention and correspond to FIGS. 7A and 7B. In FIGS. 11A and 11B, the elements similar to those shown in FIGS. 7A and 7B are represented by the same reference symbols and the duplicate description thereof will not be repeated.

In the multilayer ceramic electronic component 1c according to the sixth preferred embodiment of the present invention, the first external terminal electrode 10 and the second external terminal electrode 11 disposed near the third side surface 7.

Each first internal conductor 12 has two first extended portions 17. One of the first extended portions 17 is continuously exposed from the third side surface 7 to the first side surface 5.

Each second internal conductor 13 has two second extended portions 19. One of the second extended portions 19 is continuously exposed from the third side surface 7 to the second side surface 6.

The multilayer ceramic electronic component 1c of this preferred embodiment is arranged to be mounted on a mounting substrate (not shown) while arranging the direction in which the first internal conductors 12 and the second internal conductors 13 extend to be perpendicular or substantially perpendicular to the mounting substrate, i.e., while arranging the third side surface 7 to be used as the mounting surface.

Although not shown in the drawings, the first external terminal electrode 10 and the second external terminal electrode 11 of the multilayer ceramic electronic component 1c also have the same or substantially the same structure and are made by the same or substantially the same process as the first external terminal electrode 10 described with reference to FIG. 4.

Experimental examples to confirm the advantages and benefits of the present invention will now be described.

First, according to the first preferred embodiment, ceramic bodies of multilayer ceramic capacitors, on which external terminal electrodes are to be formed, were prepared. The specifications and conditions for preparing the ceramic bodies are as shown in Table 1 below.

TABLE 1

| Size of ceramic body | 1.6 mm × 0.8 mm × 0.8 mm |
| --- | --- |
| Thickness of ceramic layer | 1.5 μm |
| Number of effective ceramic layers | 200 |

TABLE 1-continued

| Ceramic material | BaTiO$_3$ dielectric ceramic |
| --- | --- |
| Internal conductor material | Nickel |
| Internal conductor thickness | 1.0 μm |
| Top firing temperature | 1200° C. (retained for 30 min) |
| Firing atmosphere | PO$_2$, electromotive force: 650 to 700 mV (in terms of value observed with oxygen sensor) |

Next, tin-containing layers were formed by electrolytic barrel plating on the first and second side surfaces of each ceramic body to form external terminal electrodes on the ceramic body. Subsequently, electrolytic barrel plating was performed to form copper-containing layers on the tin-containing layers.

Then heat treatment was performed in a N$_2$ atmosphere (PO$_2$, electromotive force: about 5 mV) at a temperature of about 800° C. for about 150 minutes.

Next, samples were subjected to electrolytic barrel plating to sequentially form a nickel plating film and a tin plating film on each copper-containing layer. Here, the nickel plating film was formed first and the tin plating film was then formed.

In this Experimental Example, various types of samples in which the composition of the tin-based plating defining the tin-containing layer was varied, the thickness of the tin-containing layers was varied, and the thickness of the copper-containing layer was varied were prepared. For comparative purposes, samples in which tin-containing layers were not formed as the first layers but copper-containing layers were directly formed were also prepared. The details of the samples are shown in Table 2.

Next, after each sample was mounted on a test substrate, a moisture resistance loading test (about 85° C., about 85% R.H., DC about 6.3 V, about 2000 hours, number of samples=100) and a high temperature storage life test (about 125° C., about 2000 hours, number of samples=100) were performed. In the moisture resistance loading test, changes in IR (insulation resistance) over time were analyzed. In the high temperature storage life test, the bonding strength after about 2000 hours was determined. The results are shown in Table 2.

For insulation resistance (IR), the capacitors that exhibited an IR of log IR≧6 were evaluated as "good", and the capacitors that exhibited log IR<6 were evaluated as "poor". For determination of IR, R8340A produced by Advantest Corporation was used.

For the bonding strength, the capacitors that exhibited a rate of decrease in strength after about 2000 hours from the initial strength of about 20% or less were evaluated as "good" and the capacitors that exhibited a rate exceeding about 20% were evaluated as "poor". The bonding strength was measured by mounting each sample on a glass epoxy substrate and applying shear stress from a side surface of the sample. The stress at which the sample detached from the substrate was assumed to be the bonding strength.

TABLE 2

| | First layer Type/ Thickness | Second layer Type/ Thickness | Third layer Type/ Thickness | Fourth layer Type/ Thickness | IR | Rate of decrease in bonding strength |
| --- | --- | --- | --- | --- | --- | --- |
| Sample 1 | Sn/1 μm | Cu/10 μm | — | — | Good | 15% |
| Sample 2 | Sn/5 μm | Cu/10 μm | Ni/3 μm | Sn/3 μm | Good | 12% |
| Sample 3 | Sn—Cu/1 μm | Cu/10 μm | — | — | Good | 17% |
| Sample 4 | Sn—Cu/5 μm | Cu/10 μm | Ni/3 μm | Sn/3 μm | Good | 9% |

TABLE 2-continued

|  | First layer Type/ Thickness | Second layer Type/ Thickness | Third layer Type/ Thickness | Fourth layer Type/ Thickness | IR | Rate of decrease in bonding strength |
|---|---|---|---|---|---|---|
| Sample 5 | Sn—Ni/1 μm | Cu/3 μm | Ni/3 μm | Sn/3 μm | Good | 14% |
| Sample 6 | Sn—Ni/3 μm | Cu/10 μm | Ni/3 μm | Sn/3 μm | Good | 11% |
| Sample 7 | Sn—Ni/5 μm | Cu/10 μm | Ni/3 μm | Sn/3 μm | Good | 8% |
| Sample 8 | Sn—Ni—Cu/1 μm | Cu/2 μm | Ni/3 μm | Sn/3 μm | Good | 12% |
| Sample 9 | Sn—Ni—Cu/5 μm | Cu/10 μm | Ni/3 μm | Sn/3 μm | Good | 11% |
| *Sample 10 | Cu/10 μm | — | — | — | Poor | 38% |
| *Sample 11 | Cu/10 μm | Ni/3 μm | Sn/3 μm | — | Poor | 42% |

In Table 2, the samples marked by an asterisk are outside the scope of the present invention.

Table 2 shows that Samples 1 to 9 have good IR properties and low rates of decrease in bonding strength. This is because a Sn—Cu—Ni ternary intermetallic compound was formed during the heat treatment and thus penetration of moisture and the plating solution was suppressed.

In contrast, Samples 10 and 11 exhibited poor IR and high rates of decrease in bonding strength. In Sample 10, Kirkendall voids were formed in the first copper plating layer during the heat treatment and the moisture entered the voids. This is presumably the cause of poor IR and the low bonding strength. In Sample, the plating solution entered the Kirkendall voids and this is presumably the cause of poor IR and the low bonding strength.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A multilayer ceramic electronic component comprising:
a ceramic body including a plurality of ceramic layers, the ceramic body having a first main surface and a second main surface and a plurality of side surfaces that connect the first main surface to the second main surface;
an internal conductor including nickel, the internal conductor being disposed in the ceramic body and having an exposed portion exposed at least one of the side surfaces; and
an external terminal electrode disposed on at least one of the side surfaces of the ceramic body, the external terminal electrode being electrically connected to the internal conductor; wherein
the external terminal electrode includes a first conductive layer including a Sn—Cu—Ni intermetallic compound, the first conductive layer covering the exposed portion of the internal conductor at least one of the side surfaces of the ceramic body.

2. The multilayer ceramic electronic component according to claim 1, wherein the external terminal electrode further includes a second conductive layer including copper, the second conductive layer being disposed on the first conductive layer.

3. The multilayer ceramic electronic component according to claim 2, wherein the second conductive layer includes no glass component and is substantially primarily composed of copper.

4. The multilayer ceramic electronic component according to claim 1, wherein the external conductive electrode further includes a third conductive layer defined by a plating film, the third conductive layer defining an outermost layer of the external terminal electrode.

5. A method for making a multilayer ceramic electronic component, the method comprising:
a step of preparing a ceramic body having a first main surface and a second main surface and a plurality of side surfaces connecting the first main surface to the second main surface, the ceramic body including a plurality of ceramic layers stacked on one another and an internal conductor including nickel and having an exposed portion exposed at least one of the side surfaces of the ceramic body;
a step of forming a tin-containing layer on at least one of the side surfaces of the ceramic body so that the tin-containing layer covers the exposed portion of the internal conductor;
a step of forming a copper-containing layer on the tin-containing layer; and
a step of performing heat treatment on the ceramic body having the tin-containing layer and the copper-containing layer formed thereon so that a Sn—Cu—Ni intermetallic compound layer is formed between the internal conductor and the copper-containing layer.

6. The method according to claim 5, wherein the step of forming the tin-containing layer includes forming the tin-containing layer by plating.

7. The method according to claim 5, wherein the step of forming the copper-containing layer includes forming the copper-containing layer by plating.

8. The method according to claim 5, wherein the thickness of the copper-containing layer is at least about twice the thickness of the tin-containing layer.

* * * * *